US006464873B1

(12) United States Patent
Tomaschke

(10) Patent No.: US 6,464,873 B1
(45) Date of Patent: Oct. 15, 2002

(54) INTERFACIALLY POLYMERIZED, BIPIPERIDINE-POLYAMIDE MEMBRANES FOR REVERSE OSMOSIS AND/OR NANOFILTRATION AND PROCESS FOR MAKING THE SAME

(75) Inventor: John E. Tomaschke, San Diego, CA (US)

(73) Assignee: Hydranautics, Oceanside, CA (US)

( * ) Notice: Subject to any disclaimer, the term of this patent is extended or adjusted under 35 U.S.C. 154(b) by 0 days.

(21) Appl. No.: 09/333,282

(22) Filed: Jun. 15, 1999

(51) Int. Cl.$^7$ .............................................. B01D 71/56
(52) U.S. Cl. ............ 210/500.38; 210/490; 210/500.27; 210/500.37; 264/41; 264/48; 264/49
(58) Field of Search ........................... 210/490, 500.37, 210/500.38, 500.27; 264/41, 48, 49

(56) References Cited

U.S. PATENT DOCUMENTS

| | | | |
|---|---|---|---|
| 3,904,519 A | | 9/1975 | McKinney, Jr. et al. |
| 3,996,318 A | | 12/1976 | van Heuven |
| 4,167,567 A | | 9/1979 | McCall |
| 4,259,183 A | * | 3/1981 | Cadotte ........................ 210/654 |
| 4,277,344 A | * | 7/1981 | Cadotte ........................ 210/654 |
| 4,529,646 A | | 7/1985 | Sundet |
| 4,613,878 A | | 9/1986 | Inaba et al. |
| 4,619,767 A | * | 10/1986 | Kamiyama et al. .......... 210/490 |
| 4,661,254 A | | 4/1987 | Zupancic et al. |
| 4,761,234 A | | 8/1988 | Uemura et al. |
| 4,769,148 A | * | 9/1988 | Fibiger et al. ............ 210/500.38 |
| 4,778,596 A | * | 10/1988 | Linder et al. ................ 210/638 |
| 4,783,346 A | * | 11/1988 | Sundet .................... 210/500.38 |
| 4,802,984 A | | 2/1989 | Waite |
| 4,828,708 A | | 5/1989 | Bray |
| 4,859,384 A | * | 8/1989 | Fibiger et al. ............... 264/45.1 |
| 4,872,984 A | * | 10/1989 | Tomaschke ............ 210/500.38 |
| 4,913,816 A | | 4/1990 | Waite |
| 4,948,507 A | * | 8/1990 | Tomaschke ............ 210/500.38 |
| 5,152,901 A | * | 10/1992 | Hodgdon .................... 210/490 |
| 5,160,619 A | * | 11/1992 | Yamaguchi et al. ... 210/500.38 |
| 5,178,766 A | * | 1/1993 | Ikeda et al. ............. 210/500.38 |
| 5,254,261 A | | 10/1993 | Tomaschke et al. |
| 5,616,249 A | * | 4/1997 | Hodgdon ............... 210/500.38 |
| 5,922,203 A | * | 7/1999 | Tomaschke ............ 210/500.37 |

FOREIGN PATENT DOCUMENTS

| | | | |
|---|---|---|---|
| BE | 753088 | 1/1971 | ............ 210/500.38 |
| CA | 1 188 577 | 6/1985 | ............ 210/500.38 |
| DE | 27 04 600 A1 | 8/1978 | ............ 210/500.38 |
| EP | 0 176 992 A | 4/1986 | ............ 210/500.38 |
| EP | 0 787 525 A1 | 8/1997 | |
| JP | 50-001080 | 1/1975 | ............ 210/500.38 |
| JP | 61-000409 A | 1/1986 | ............ 210/500.38 |
| JP | 03-232523 A | 10/1991 | ............ 210/500.38 |

OTHER PUBLICATIONS

Samuel D. Arthur, "Structure–Property Relationship in a Thin Film Composite Reverse Osmosis Membrane", J. Membrane Science, 46:243–260, (1989).

John E. Cadotte, "Evolution of Composite Reverse Osmosis Membranes", Materials Science of Synthetic Membranes, Chapter 12, pp. 273–294, American Chemical Society of Symposium Series (1985).

* cited by examiner

Primary Examiner—Ana Fortuna
(74) Attorney, Agent, or Firm—Akin, Gump, Strauss, Hauer & Feld, L.L.P.

(57) ABSTRACT

Selective, water-permeable membranes for reverse osmosis and nanofiltration are prepared by interfacially polymerizing on a microporous support an essentially monomeric bipiperidine reactant, and an essentially monomeric amine-reactive polyfunctional aromatic or cycloaliphatic acyl halide having on the average at least about 2 acyl halide groups per reactant molecule. The polymerization is optionally carried out in the presence of a monomeric amine salt, which can increase the flux rate of the resulting membrane.

26 Claims, No Drawings

INTERFACIALLY POLYMERIZED, BIPIPERIDINE-POLYAMIDE MEMBRANES FOR REVERSE OSMOSIS AND/OR NANOFILTRATION AND PROCESS FOR MAKING THE SAME

BACKGROUND OF THE INVENTION

The present invention relates to selective, water permeable membranes useful for the separation of fluid mixtures and solutions by reverse osmosis and nanofiltration. In particular, the present invention is directed to bipiperidine-based polyamide, water permeable membranes which are useful for desalination of, or other solute removal from, an aqueous solution.

It is known that dissolved substances can be separated from their solvents by the use of semi-permeable membranes. For example, of great practical interest is the removal of salts from water by reverse osmosis (RO) or by nanofiltration (NF). The efficiency and economy of such removal is of tremendous economic significance in order to provide potable water from brackish or sea water for household or agricultural use. A critical factor in desalination is the performance of the membrane in terms of salt rejection, i.e., the reduction in salt concentration across the membrane, and flux, i.e., the flow rate across the membrane. For practical RO applications, the flux should be on the order of greater than at least 15 gfd ("gallons per square foot per day") at a pressure of about 15 atmospheres for brackish water. More preferably, commercial RO applications now require fluxes greater than about 25 gfd (about 1.0 $m^3/m^2$-day) at a pressure of about 15 atmospheres for brackish water. NF applications require at least 30 gfd (about 1.2/ $m^3m^2$-day) at a pressure of 10 atmospheres. Moreover, salt rejections greater than 99% are required for RO and greater than 50% for NF. The continuing goal of research and development in this area is to develop membranes having increased flux and/or solute rejection, which are useful in desalination and removal of other low molecular weight solutes.

An additional factor which can have a significant economic impact on the desalination performance of RO and NF membranes is the amount of pressure which must be applied to achieve acceptable flux rates as previously discussed. The selectivity of the membranes, i.e., the preferential rejection of a certain ion or ions over a different ion or ions, can have a significant effect on what amount of pressure will be required. Most salt solutions contain several different salts, e.g., sea water contains sodium chloride, magnesium sulfate, calcium sulfate in addition to other salts. RO and/or NF desalination processes, wherein selectivity is low and overall salt rejection is high, can create a high osmotic pressure which in turn requires increased pressure to achieve acceptable water flux rates. The increased concentration of salt ions on one side of a membrane results in an increased osmotic pressure on that side of the membrane. As the osmotic pressure on one side grows, the salt ions increasingly try to pass through the membrane to balance the pressure on each side of the membrane, and thus, greater pressure is required to force desalinated water through the membrane. Selectivity, wherein some ions pass through the membrane while others do not, can alleviate this problem by balancing the osmotic pressure on each side of the membrane.

Among the known membranes used in desalination are included a large number of various types of polyamides which are prepared by a variety of methods. Of particular interest within this broad group of polyamide membranes are crosslinked aromatic polyamide membranes. The crosslinked aromatic polyamide membranes include, for example, those disclosed in the following U.S. Patents.

U.S. Pat. No. 3,904,519, issued to McKinney et al., discloses reverse osmosis membranes of improved flux prepared by crosslinking aromatic polyamide membranes using crosslinking agents and/or irradiation. The polyamides are prepared, for example, by the interfacial polymerization of amine groups and carboxyl groups followed by crosslinking.

U.S. Pat. No. 3,996,318, issued to van Heuven, teaches the production of aromatic polyamide membranes, wherein crosslinking is achieved using a reactant having a functionality of three or greater.

U.S. Pat. No. 4,277, 344, issued to Cadotte, describes a reverse osmosis membrane which is the interfacial reaction product of an aromatic polyamine having at least two primary amine substituents with an aromatic acyl halide having at least three acyl halide substituents. The preferred membrane is made of a poly (phenylenediamine trimesamide) film on a porous polysulfone support.

U.S. Pat. No. 4,761,234, issued to Uemura et al., shows a membrane similar to U.S. Pat. No. 4,277,344 in which aromatic tri- or higher aromatic amines are employed.

U.S. Pat. No. 4,661,254, issued to Zupanic et aL, discloses a reverse osmosis composite membrane formed by the interfacial polymerization of a triaryl triamine with an aromatic carboxylic acid chloride.

U.S. Pat. No. 4,619,767, issued to Kamiyama et al., describes membranes prepared by crosslinking polyvinyl alcohol and secondary di- or higher amines with polyfunctional crosslinking agents. Both aromatic and aliphatic amine components are disclosed.

U.S. Pat. Nos. 4,872, 984 and 4,948,507, issued to the present applicant, describe the interfacial synthesis of reverse osmosis membranes from an essentially monomeric polyamine having at least two amine functional groups and an essentially monomeric polyfunctional acyl halide having at least about 2.2 acyl halide groups per reactant molecule, in the presence of a monomeric amine salt. Both aromatic and aliphatic polyamines and polyfunctional acyl halides are disclosed.

Copending U.S. application Ser. No. 08/944,995, of the present applicant, filed on Oct. 7, 1997 (now allowed), discloses a membrane which is the interfacial polymerization product of an amide-functionalized polyamine with an aromatic acyl halide having at least two acyl halide substituents.

Interesting reviews and comparisons of various composite reverse osmosis membranes are included in J. E. Cadotte, "Evolution of Composite Reverse Osmosis Membranes", Materials Science of Synthetic Membranes, Chapter 12, pp. 273–294, American Chemical Society Symposium Series (1985) and S. D. Arthur, "Structure-Property Relationship in a Thin Film Composite Reverse Osmosis Membrane", Journal of Membrane Science, 46:243–260, Elsevier (1989).

While some of the above-referenced membranes are commercially useable, prior art membranes are often not very selective or preferential to one type of ion over another. Therefore, significant pressure is often required to achieve desired flux rates. The goal of the industry continues to be to develop membranes that have better flux and salt rejection characteristics and better resistance to disinfectants such as chlorine, in order to reduce costs and increase efficiency of operation. The development of selective water-permeable membranes wherein selectivity is high is also a goal of the industry. It would be desirable to achieve high flux rates at low pressures wherein sulfate ion rejection is high as compared to chloride ion rejection. Once sulfate has been removed from a salt solution, chloride desalination can be accomplished using a number of distillation techniques without the undesirable effects resulting from the presence of sulfate ions, such as scale formation. Scale formation is known to decrease the efficiency of distillation operations.

The piperazine-derived polyamide membranes disclosed in U.S. Pat. No. 4,619,767 are perhaps the most selective of the prior art membranes, yet still do not provide the requisite selectivity between sulfate ions and chloride ions necessary to reduce operating pressures and increase flux. Thus, there is a need in the art for highly selective membranes which can operate at high flux rates and low pressures with high sulfate rejection.

BRIEF SUMMARY OF THE INVENTION

The present invention includes a water permeable membrane prepared by interfacially polymerizing, on a microporous support: (1) an essentially monomeric bipiperidine reactant of Formula (I):

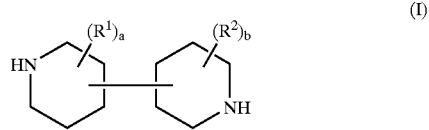

(I)

wherein a and b each independently represent an integer of from 0 to 4 and each $R^1$ and each $R^2$ independently represent a non-reactive substituent; and (2) an essentially monomeric amine-reactive reactant comprising a polyfunctional aromatic or cycloaliphatic acyl halide or mixture thereof, wherein the amine-reactive reactant has, on the average, at least about 2 acyl halide groups per reactant molecule.

The present invention also includes a process for producing a water permeable membrane comprising interfacially polymerizing, on a microporous support, (1) an essentially monomeric bipiperidine reactant of Formula (I); and (2) an essentially monomeric amine-reactive reactant comprising a polyfunctional aromatic or cycloaliphatic acyl halide or mixture thereof, wherein the amine-reactive reactant has, on the average, at least about 2 acyl halide groups per reactant molecule.

DETAILED DESCRIPTION OF THE INVENTION

Water permeable membranes prepared by the interfacial polymerization of an essentially monomeric bipiperidine reactant of Formula (I) and an essentially monomeric amine-reactive reactant have been found to exhibit unexpectedly high selectivity towards the rejection of sulfate ions as compared with the rejection of chloride ions, and operate at high flux rates even at low applied pressures.

As used throughout the specification, the term "essentially monomeric" means a chemical compound capable of chain extension and/or crosslinking and/or other polymerization reactions, wherein said compound is relatively low in molecular weight, readily soluble in one or more common liquid solvents and is generally free of repeating units linked by polyamide linkages (—C(O)—NH—). However, as long as the solubility of the compound in most common liquid solvents is not reduced to less than, for example, 0.01% w/w, one or two or a few repeating units can be present and the compound can be "essentially monomeric" in character.

The membranes of the present invention may be formed by various methods of interfacial polymerization, a number of which are known in the art. Presently preferred are the methods described in prior U.S. Pat. Nos. 4,872,984 and 4,948,507, the disclosures of which are incorporated herein by reference. While the present invention will now be described herein with reference to the method in which the polymerization is carried out in the presence of an optional monomeric amine salt, it will be understood that the following methods could be carried out without the presence of the monomeric amine salt, which is used in the methods of the prior above-mentioned patents.

In one embodiment, the objects of the present invention have been met by a water permeable membrane produced by the process comprising the steps of:

(a) coating a microporous support with an aqueous solution comprising (i) an essentially monomeric bipiperidine reactant of Formula (I) with or without (ii) a monomeric amine salt, to form a liquid layer on said microporous support;

(b) contacting said liquid layer with an organic solvent solution of an essentially monomeric amine-reactive reactant comprising a polyfunctional aromatic or cycloaliphatic acyl halide, or mixture thereof, wherein the amine-reactive reactant has, on the average, at least about 2 acyl halide groups per reactant molecule; and (c) drying the product of step (b) so as to form said water permeable membrane.

In a second embodiment, the water permeable membrane is produced by the process comprising the steps of:

(a) coating a microporous support with a first aqueous solution comprising an optional monomeric amine salt to form a monomeric amine salt layer on said microporous support;

(b) coating said monomeric amine salt layer with a second aqueous solution comprising an essentially monomeric bipiperidine reactant of Formula (I) to form a liquid layer on said monomeric amine salt layer.

(c) coating said liquid layer with an organic solvent solution of an essentially monomeric amine-reactive reactant, comprising a polyfunctional aromatic or cycloaliphatic acyl halide, or mixture thereof, wherein the amine-reactive reactant has, on the average, at least about 2 acyl halide groups per reactant molecule; and (d) drying the product of step (c) so as to form said water permeable membrane.

The particular microporous support employed in the present invention is not critical thereto. Examples of such microporous supports useful in the present invention include those made of a polyarylether sulfone, such as a polysulfone and a polyether sulfone; a polyimide; or a polyvinylidene fluoride. The microporous support is preferably made of a polyarylether sulfone. The thickness of the microporous support is not critical to the present invention. Generally, the thickness of the microporous support is about 25 to 125 $\mu$m, preferably about 40 to 75 $\mu$m.

Bipiperidine reactants of Formula (I) which can be used in the present invention include those having two piperidine units bound to each other by a carbon-carbon single bond, said carbon-carbon single bond formed between any two of the heterocyclic ring-carbon atoms, (one carbon atom from each heterocyclic piperidine ring). Thus, bipiperidine reactants useful in the present invention include, for example, 2,2'-bipiperidines, 2,3'-bipiperidines, 2,4'-bipiperidines, 2,5'-bipiperidines, 2,6'-bipiperidines, 3,3'-bipiperidines, 3,4'-bipiperidines, 3,5'-bipiperidines, 3,6'-bipiperidines, 4,4'-bipiperidines, 4,5'-bipiperidines and 4,6'-bipiperidines. Preferably, the bipiperidine reactant used in the present invention comprises a 4,4'-bipiperidine of Formula (II):

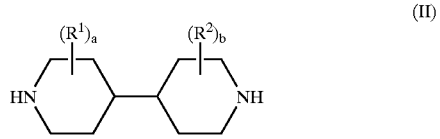

(II)

wherein a, b, $R^1$ and $R^2$ are as defined above.

Bipiperidine reactants which can be used in the present invention may have from zero to four non-reactive substituents, in place of ring-saturating hydrogen atoms, on each heterocyclic ring, as represented in Formulas (I) and (II) by the symbols $(R^1)_a$ and $(R^2)_b$. While it is possible for the bipiperidine reactants of Formulas (I) and (II) to have a total of eighteen (18) substituents, (i.e., wherein all hydrogen atoms have been replaced), such extensive substitution is not preferred due to factors such as steric hindrance, increased molecular weight and, depending on the nature of the substituent, detrimental hydrophobicity. Generally, when a substituent which is highly hydrophobic is present, a lesser degree of substitution is preferred. The nitrogen atoms are secondary amino functionalities and are generally not N-substituted. N-substitution, which would result in tertiary amino groups, substantially reduces the polymerization capability of the bipiperidine reactant. Thus, while N-substitution is not preferred due to polymerization reaction considerations, N-substitution wherein the substituent itself has a secondary amino functionality is possible.

Non-reactive substituents which may be bound to the carbon atoms of the heterocyclic rings of the bipiperidines of Formulas (I) and (II) include, for example, alkyl, alkoxy, hydroxyl, alkylhydroxy, and halide moieties. As used herein, the term "non-reactive" shall refer to any substituent or functional moiety which is non-reactive or is at least less reactive than the secondary amino functionalities of the bipiperidine monomers with the amine-reactive reactants. While not wishing to be bound by theory, it is regarded that any substituent which is less nucleophilic than the nitrogen atoms can be incorporated into the bipiperidines. Thus, while the oxygen atoms of hydroxyl and alkylhydroxy moieties are also nucleophilic, they are less so than the nitrogen atoms of the bipiperidine reactants of Formulas (I) and (II), and are considered non-reactive substituents. Generally, any substituent, which will not interfere with the reaction between the secondary amino groups of the bipiperidine reactant and the acyl halide functionalities of the amine-reactive reactants of the present invention, may be incorporated as a non-reactive substituent in the bipiperidine reactants of Formulas (I) and (II). Additionally, the incorporation of such hydrophilic substituents, such as hydroxyl and alkylhydroxy moieties for example, can increase water permeability thus increasing flux rates of the resulting membranes.

Alkyl moieties which may be used as non-reactive substituents include, but are not limited to, straight and branched aliphatic hydrocarbons having from 1 to about six carbon atoms. For example, each $R^1$ and each $R^2$ can represent a methyl group, an ethyl group, a propyl group, a butyl group, a pentyl group, a hexyl group, an isopropyl group, an s-propyl group, or a t-butyl group, etc. Again, where hydrophobic, higher molecular weight alkyl moieties are used, a lesser degree of substitution is preferred.

Alkoxy moieties which may be used as non-reactive substituents include, but are not limited to, the alkoxy derivatives of the alkyl moieties set forth above, such as, methoxy groups, ethoxy groups, propoxy groups, etc. Also included are minimally repeating ethylene oxides and propylene oxides, (i.e., up to about 6 carbon atoms).

Hydroxyl (—OH) and alkylhydroxy (—R(OH)) moieties may be used as non-reactive substituents. Alkylhydroxy moieties which may be used include short chain straight and branched alkanols, such as, for example, -methyl(hydroxy), -ethyl(hydroxy), -isopropyl(hydroxy), -hexyl(dihydroxy), etc. The alkylhydroxy moieties may be polyhydroxylated.

Halides may also be incorporated as non-reactive substituents. Fluoride and chloride are preferred halide substituents. Other halides, i.e., bromide, iodide and astitide, are potentially too reactive (they are good leaving groups), such that interference with the polymerization reaction would likely result, and are therefore not preferred substituents.

The bipiperidine reactants of the present invention are preferably unsubstituted, wherein both a and b equal zero, or have a total number of non-reactive substituents such that a+b is less than or equal to 4, and more preferably, a+b is less than or equal to 2. If one or more non-reactive substituents are present, hydroxyl moieties and alkylhydroxy moieties having 3 or fewer carbon atoms are preferred, as the presence of low molecular weight hydrophilic groups is believed to increase water permeability thus enhancing overall flux performance.

The bipiperidine reactants useful in the present invention can be readily obtained by the reduction or hydrogenation of their commercially available bipyridine analogues. Electrolytic reduction of a bipyridine analogue is an example of a common method used to obtain bipiperidines. Hydrogenation by direct contact with hydrogen gas in the presence of a suitable catalyst, such as platinum, palladium, or ruthenium, could also be used. Many of the bipiperidine reactants of Formulas (I) and (II) are commercially available and can be obtained from chemical distributors such as, for example, Aldrich Chemical Co., Milwaukee, Wis. Generally, such products are packaged as a dihydrochloride salt of the bipiperidine for purposes of stability. The free base amine can be re-isolated easily by neutralizing the dihydrochloride salt with a base such as, for example, sodium hydroxide, and extracting the base from the neutralized solution using an organic solvent such as chloroform.

Examples of bipiperidine reactants which are preferred include, but are not limited to: 4,4'-bipiperidine; 3-hydroxy-4,4'-bipiperidine; 3,3'-dihydroxy-4,4'-bipiperidine; 3-hydroxymethyl-4,4'-bipiperidine; 3,3'-dihydroxymethyl-4,4'-bipiperidine; 3-(2-hydroxy)ethyl-4,4'-bipiperidine; and 3,3'-di(2-hydroxy)ethyl-4,4'-bipiperidine. The most preferred bipiperidine reactant is an unsubstituted 4,4'-bipiperidine.

The amine-reactive reactant used in the present invention may be selected from any of a variety of essentially monomeric, polyfunctional, aromatic or cycloaliphatic acyl halides, or a mixture of such acyl halides, wherein the amine-reactive reactant has, on the average, at least about 2, and preferably, on the average, about three to about four acyl halide groups per reactant molecule.

Preferred amine-reactive reactants are the aromatic acyl halides of U.S. Pat. No. 4,277,344 of Cadotte, which have at least three acyl halide substituents per molecule, e.g., trimesoyl chloride. Also preferred are the difunctional aromatic acyl halides, such as described in U.S. Pat. No. 4,828,708 of Bray, e.g., isophthaloyl chloride or terephthaloyl chloride. Mixtures of trifunctional and difunctional acyl halides may also be used. When a mixture of trifunctional and difunctional acyl halides are used, any mixing ratio may exist. However, generally, greater amounts of trifunctional acyl halides are preferred.

Preferred cycloaliphatic acyl halides for use in the present invention include the cyclohexane tricarbonyl chlorides of U.S. Pat. No. 4,529,646 of Sundet, for example.

Other cycloaliphatic acyl halides for use in the present invention include the tetra-substituted acyl chlorides of cyclopentane tetracarboxylic acid and cyclobutane tetracarboxylic acid, namely 1,2,3,4-cyclopentane tetracarboxylic acid chloride (CPTC) and 1,2,3,4-cyclobutane tetracarboxylic acid chloride (CBTC) and the tri-substituted acyl chlorides of cyclopentane tricarboxylic acid and cyclobutane tricarboxylic acid, namely, 1,2,4-cyclopentane tricarboxylic acid chloride (CPTrC) and 1,2,3-cyclobutane tricarboxylic acid chloride (CBTrC). These cycloaliphatic acyl halides are described in U.S. Pat. No. 5,254,261 of the present applicant.

In addition to the cycloaliphatic acyl halide reactants described above, the amine-reactive reactant may also include in admixture with the cycloaliphatic acyl halide an essentially monomeric polyfunctional aromatic acyl halide having at least about two acyl halide groups per reactive molecule. That is, up to about 90 weight percent, and preferably up to about 70 weight percent, of the cycloaliphatic acyl halide may be substituted with one or more aromatic acyl halides.

Examples of such aromatic acyl halides include isophthaloyl halide, trimesoyl halide, terephthaloyl halide, and mixtures thereof. The preferred aromatic acid halides employed in the present invention with or without the cycloaliphatic acyl halide are isophthaloyl chloride (IPC), trimesoyl chloride (TMC) and/or terephthaloyl chloride (TPC), and mixtures thereof.

The monomeric amine salt which may optionally be employed in the present invention may be a salt of a monomeric amine and an acid, and is preferably a salt of a tertiary amine and a strong acid. As used herein, a strong acid is an acid which reacts essentially completely with water to give a hydronium ion. Examples of such strong acids include an aromatic sulfonic acid; an aliphatic sulfonic acid; a cycloaliphatic sulfonic acid, such as camphorsulfonic acid; trifluroacetic acid; nitric acid; hydrochloric acid; and sulfuric acid.

The particular monomeric amine salt employed in the present invention is not critical thereto and may be any aliphatic, alkoxy, cycloaliphatic, heterocyclic or alkanol monomeric amine salt. Preferred monomeric amine salts employed in the invention are represented by Formulas (I) and (II) described in U.S. Pat. No. 5,254,261 of the present applicant.

More preferably, the monomeric amine salt employed in the present invention is a water soluble salt of a strong acid and a tertiary amine selected from the group consisting of a trialkylamine, such as trimethylamine, triethylamine, tripropylamine; an N-alkylcycloaliphatic amine, such as 1-methylpiperidine; an N, N-dialkylamine, such as N, N-dimethylethylamine and N, N-diethylmethylamine; an N, N-dialkyl ethanolamine, such as N, N-dimethylethanolamine; a bicyclic tertiary amine, such as 3-quinuclidinol and mixtures thereof, or a quaternary amine selected from at least one member of the group consisting of a tetraalkylammonium hydroxide, such as tetramethylammonium hydroxide, tetraethylammonium hydroxide, and tetrapropylammonium hydroxide; a benzyltrialkylammonium hydroxide, such as benzyltrimethyl-ammonium hydroxide, benzyltriethylammonium hydroxide, and benzyltripropylammonium hydroxide; and mixtures thereof. A particularly preferred monomeric amine salt is the amine salt of triethylamine and camphorsulfonic acid (TEACSA).

The monomeric amine salt is employed either as a solid, which is water soluble, or as an aqueous solution having dissolved therein the monomeric amine salt. The monomeric amine salt is preferably employed as an aqueous solution thereof. The monomeric amine used to prepare the monomeric amine salt preferably has a $pK_a$ of more than about 8, more preferably about 9 to about 13.

In one embodiment of the present invention, the microporous support is coated with a first aqueous solution containing generally zero to about 10 wt % of a monomeric amine salt, preferably about 3 to about 8 wt % of a monomeric amine salt. The first aqueous solution is preferably adjusted to a pH of about 3 to about 11, more preferably about 5 to about 9, by controlling the concentration of either the acid or the monomeric amine, or both. In this case, the second aqueous solution containing a bipiperidine reactant of Formula (I) generally has a pH of about 10 to about 14, preferably about 11 to about 13. Further, in this case, where the monomeric amine salt and the bipiperidine reactant are separately coated on the microporous support, the coating amount is generally adjusted so that the molar ratio of the monomeric amine salt to the bipiperidine reactant is zero to about 15, preferably about 4 to about 12.

In order to save a step in the process of the present invention, the above aqueous solution of the monomeric amine salt can also contain the bipiperidine reactant. The bipiperidine reactant is generally present in the aqueous solution at a concentration of from about 0.1% w/v to about 0.8% w/v, and preferably from about 0.15% w/v to about 0.5% w/v. In this case the aqueous solution is generally adjusted to a pH of about 10 to about 14, preferably about 11 to about 13. Further, in this case, the molar ratio of the monomeric amine salt to the bipiperidine reactant is also generally adjusted to zero to about 15, preferably about 4 to about 12.

The choice of pH depends on the base strength of the particular bipiperidine reactant employed. In general, the above-described lower range pH value of the aqueous bipiperidine solution should be about the same as the $pK_a$ of the particular bipiperidine employed and the higher range pH value should be at least as high as the particular unadjusted free base aqueous pH.

The above aqueous solutions are coated by any well known means, such as dipping, spraying, roller coating, rod coating or cloth sheet coating and allowed to remain in place generally for about 5 seconds to about 10 minutes, preferably about 10 seconds to about 1 minute.

If desired, the aqueous solutions may contain a surfactant for more improved results. The particular surfactant employed in the present invention is not critical thereto. Examples of such surfactants include sodium dodecyl benzene sulfonate (SDBS), sodium lauryl sulfate (SLS) or mixtures thereof. The surfactants are generally employed at a concentration of about 0.05% to about 1% w/v, preferably about 0.1% to about 0.75% w/v.

After forming a liquid layer containing the monomeric amine salt and the bipiperidine reactant of Formula (I), a second layer of an organic solvent solution containing the essentially monomeric amine-reactive reactant is coated thereon. Generally, the organic solvent solution contains about 0.05% to about 2% w/v, preferably about 0.15% to about 1% w/v of the amine-reactive reactant. It is preferable to employ a molar ratio of about 0.25 to about 4, preferably about 0.5 to about 2, of the bipiperidine reactant to the amine-reactive reactant.

The organic solvent employed in the present invention is one which is non-miscible with water. The particular organic solvent employed in the present invention is not critical thereto. Examples of such organic solvents include alkanes, such as hexane and nonane; cycloalkanes, such as cyclohexane; and halogenated derivatives thereof, such as FREON® (E. I. duPont de Nemours), including 1,1,2-trichlorotrifluoroethane; and mixtures thereof. The preferred organic solvents employed in the present invention are alkanes having from 6 to 12 carbon atoms.

The organic solvent containing the amine-reactive reactant is coated by any well known means, such as dipping or spraying, and allowed to remain in place generally for about 3 seconds to about 20 minutes, preferably about 5 seconds to about 30 seconds.

After each step of coating the aqueous and organic solvent solutions, the excess solutions are removed. Then, after the last coating and draining step, the resulting product is dried to form a water permeable membrane. The resulting product is generally dried in an oven at about room temperature to about 150° C., preferably about 100 to about 150° C. for about 1 to about 10 minutes, preferably about 2 to about 8 minutes. In this manner, a polyamide layer is formed on the microporous support. The drying step aids in effecting the reaction between the bipiperidine reactant and the amine-reactive reactant, thus producing the polyamide layer (i.e., interfacial polymerization). The thickness of the resulting polyamide layer is generally about 0.01 to about 0.4 $\mu$m, preferably about 0.02 to about 0.2 $\mu$m.

The following examples are provided for illustrative purposes only and are in no way intended to limit the scope of the present invention. Unless otherwise indicated below, all percentages (%) of ingredients are percent by weight (i.e., wt/wt %).

MEMBRANE PREPARATION EXAMPLE 1

Preparation of a Bipiperidine-Based Polyamide Membrane

Free base, unsubstituted 4,4'-bipiperidine reactant isolated from its supplied dihydrochloride salt form, TEACSA (salt of triethylamine and camphorsulfonic acid), and sodium lauryl sulfate (SLS) were combined and diluted with 10 L deionized water, to obtain an aqueous solution comprising bipiperidine reactant at a concentration of 0.35% w/v, TEACSA at a concentration of 6.6% w/v and SLS at a concentration of 0.375% w/v. The pH of the solution was adjusted to approximately 12.75 by the addition of sodium hydroxide.

All temperatures and time durations set forth herein are approximate. A membrane was prepared in a lab-scale control frame procedure in which a six-inch square of polysulfone ultrafilter substrate was clamped between two Teflon® (dupont) frames and coated on the upper surface with the aqueous solution of the 4,4'-bipiperidine reactant for 10 seconds. The substrate was then drained for 30 seconds, then contacted for 15 seconds with a trimesoyl chloride (TMC)/Isopar®$^L$ (Exxon Corp.) hydrocarbon solution, containing 0.55% w/v of TMC. After draining for 15 seconds, the membrane was dried in a convection oven at 130° C. for 2 minutes and with 100° C. forced air for about 1.5 minutes.

COMPARATIVE MEMBRANE PREPARATION EXAMPLE 2

Preparation of a Piperazine-Derived Polyamide Membrane

A comparative membrane was prepared essentially according to U.S. Pat. No. 4,619,767, in a lab-scale control frame procedure in which a six-inch square of polysulfone ultrafilter substrate was clamped between two Teflon® (duPont) frames and coated on the upper surface with the aqueous solution containing 0.25% by weight of polyvinyl alcohol, 0.25% by weight of piperazine and 0.5% by weight of sodium hydroxide, it was immersed in a 1 wt % solution of trimesoyl chloride in n-hexane at 25° C. for 1 minute. After draining for 15 seconds, the membrane was dried in a convection oven at 110° C. for 10 minutes.

MEMBRANE PERFORMANCE

The membranes prepared in Membrane Preparation Examples 1 and 2 were tested for performance, i.e., flux rate, salt rejection and selectivity, using four different salt solutions. The first feed solution was aqueous magnesium sulfate having a concentration of 2000 ppm. The second feed solution was a synthetic sea water ("Sea Water #1") which contained 12100 ppm of sodium ions (Na$^+$), 1100 ppm of magnesium ions (Mg$^2$), 18100 ppm chloride ions (Cl$^-$) and 2580 ppm of sulfate ions (SO$_4^{2-}$). The third feed solution was aqueous sodium chloride having a concentration of 1500 ppm. The fourth feed solution was a synthetic sea water ("Sea Water #2") which contained 11500 ppm of sodium ions, 2550 ppm of magnesium ions, 802 ppm of calcium ions (Ca$^{2+}$), 21490 ppm chloride ions and 5000 ppm of sulfate ions. Transport properties of each of the two membranes are shown below in Table 1.

TABLE 1

| | | Feed Solution | Pressure | Flux | Salt Rejection (%) | | | | |
|---|---|---|---|---|---|---|---|---|---|
| | Membrane | (ppm) | (psig) | (gfd) | Total | SO$_4^{2-}$ | Cl$^-$ | Mg$^{2+}$ | Ca$^{2+}$ | Na$^+$ |
| A | Example 1 | MgSO$_4$ | 130 | 70 | 99.2 | | | | | |
| | Example 2 | (2000) | | 16 | 98.0 | | | | | |
| B | Example 1 | Sea Water | 100 | 25 | | 99.2 | 11.2 | 35.1 | | 13.7 |
| | Example 2 | #1 | | 2.7 | | 97.7 | 19.6 | 56.5 | | 18.6 |
| C | Example 1 | NaCl | 150 | 100 | 69.9 | | | | | |
| | Example 2 | (1500) | | 32 | 94.5 | | | | | |
| D | Example 1 | Sea Water | 85 | 15.7 | | 98.0 | 6.7 | 41.2 | 33.2 | 8.9 |
| | Example 2 | #2 | 350 | 14.9 | | 99.2 | 55.0 | 91.7 | 74.3 | 47.1 |

The bipiperidine membrane prepared in accordance with Membrane Preparation Example 1 ("MPE1") exhibited superb selectivity towards the rejection of sulfate ions over chloride ions, while maintaining a high flux rate at a low operating pressure. The performance of the bipiperidine membrane showed significantly increased selectivity over the prior art piperazine-derived polyamide membrane.

As shown in comparison "A" in Table 1, when each membrane was subjected to a magnesium sulfate feed, the bipiperidine-based polyamide membrane prepared in accordance with MPE1 had increased salt rejection at the same pressure, but exhibited a substantially higher flux rate. In fact, the flux through the bipiperidine-based polyamide membrane was over 4 times greater than that of the piperazine-derived polyamide membrane prepared in the Comparative Membrane Preparation Example 2 ("CMPE2"). The tendency of the bipiperidine membranes to allow chloride to pass can also be seen by comparison "C" in Table 1. When each membrane was subjected to pure sodium chloride feeds, the piperazine-derived polyamide membrane prepared in CMPE2 rejected 94.5% of the salt, whereas the bipiperidine membrane prepared in MPE1 rejected only 69.9% of the salt at much higher flux rates.

In comparison "B", it is shown that with multi-salt solutions, such as sea water, the bipiperidine membrane prepared in MPE1 significantly outperforms the piperazine-derived polyamide membrane of CMPE2. At the same pressure (100 psig), flux through the bipiperidine membrane was almost ten times greater, while sulfate rejection was approximately two percent higher and chloride rejection was several percent lower.

In comparison "D", in order for the membranes prepared in MPE1 and CMPE2 to achieve similar flux rates, the operating pressure applied to the Piperazine-membrane of CMPE2 had to be increased to 350 psig, compared to 85 psig for the bipiperidine membrane of MPE1. This is also a four-fold increase. Moreover, even when such increased pressure was applied in order to bring the flux rate of the piperazine-derived polyamide membrane close to that of the bipiperidine membrane, selectivity for rejecting sulfate as compared to the rejection of chloride (i.e., the disparity between percentage rejection of sulfate and the percentage rejection of chloride) was not close to that of the bipiperidine membrane. Whereas the bipiperidine membrane prepared in MPE1 rejected only 6.7% of the chloride ions and 98.0% of the sulfate ions, the piperazine-derived polyamide membrane prepared in CMPE2 rejected 55% of the chloride ions and 99.2% of the sulfate ions. Thus, it can be seen that the bipiperidine membranes of the present invention exhibit significantly increased selectivity towards the rejection of sulfate ions as compared to the rejection of chloride ions, while flux rates are increased with less applied pressure.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A water permeable membrane prepared by interfacially polymerizing, on a microporous support: (1) an amine solution consisting essentially of an essentially monomeric bipiperidine reactant of Formula (I):

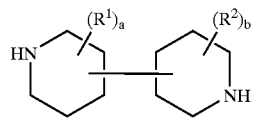

(I)

wherein a and b each independently represent an integer of from 0 to 4 and each $R^1$ and each $R^2$ independently represent a non-reactive substituent; and (2) an essentially monomeric amine-reactive reactant comprising a polyfunctional aromatic or cycloaliphatic acyl halide or mixture thereof, wherein the amine-reactive reactant has, on the average, at least about 2 acyl halide groups per reactant molecule.

2. The water permeable membrane as claimed in claim 1, wherein polymerization occurs in the presence of a monomeric amine salt.

3. The water permeable membrane as claimed in claim 1, wherein said water permeable membrane is produced by the process comprising the steps of:
   (a) coating a microporous support with an aqueous solution consisting essentially of an essentially monomeric bipiperidine reactant of Formula (I) to form a liquid layer on said microporous support;
   (b) contacting said liquid layer with an organic solvent solution of an essentially monomeric amine-reactive reactant comprising said polyfunctional acyl halide or mixture thereof; and,
   (c) drying the product of step (b) so as to form said water permeable membrane.

4. The water permeable membrane as claimed in claim 3, wherein said aqueous bipiperidine solution also contains a monomeric amine salt.

5. The water permeable membrane as claimed in claim 1, wherein said water permeable membrane is produced by the process comprising the steps of:
   (a) coating a microporous support with a first aqueous solution comprising a monomeric amine salt to form a monomeric amine salt layer on said microporous support;
   (b) coating said monomeric amine salt layer with a second aqueous solution consisting essentially of an essentially monomeric bipiperidine reactant of Formula (I) to form a liquid layer on said monomeric amine salt layer;
   (c) coating said liquid layer with an organic solvent solution of an essentially monomeric amine-reactive reactant comprising said polyfunctional acyl halide or mixture thereof; and
   (d) drying the product of step (c) so as to form said water permeable membrane.

6. The water permeable membrane as claimed in claim 1, wherein each of said non-reactive substituents is selected from the group consisting of alkyl, alkoxy, hydroxyl, alkylhydroxy, and halide moieties.

7. The water permeable membrane as claimed in claim 1, wherein said essentially monomeric bipiperidine reactant comprises a 4,4'-bipiperidine reactant of Formula (II):

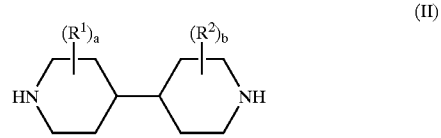

(II)

wherein each $R^1$ and each $R^2$ independently represents a non-reactive substituent and a and b each independently represent an integer of from 0 to 4.

8. The water permeable membrane as claimed in claim 7, wherein both a and b equal zero.

9. The water permeable membrane as claimed in claim 7, wherein a and b each equal 1.

10. The water permeable membrane as claimed in claim 9, wherein $R^1$ and $R^2$ each represent a hydroxyl moiety.

11. The water permeable membrane as claimed in claim 1, wherein said acyl halide has a functionality on the average of from about 2 to about 4 acyl halide groups per reactant molecule.

12. The water permeable membrane as claimed in claim 11, wherein said acyl halide is selected from the group consisting of cyclohexane acyl halides, cyclobutane acyl halides and cyclopentane acyl halides.

13. The water permeable membrane as claimed in claim 11, wherein said acyl halide is selected from the group consisting of isophthaloyl chloride, trimesoyl chloride, and terephthaloyl chloride.

14. A process for producing a water permeable membrane comprising interfacially polymerizing, on a microporous support, (1) an amine solution consisting essentially of an essentially monomeric bipiperidine reactant of Formula (I):

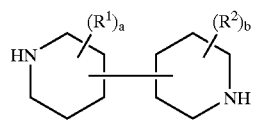
(I)

wherein a and b each independently represent an integer of from 0 to 4 and each $R^1$ and each $R^2$ independently represent a non-reactive substituent; and (2) an essentially monomeric amine-reactive reactant comprising a polyfunctional aromatic or cycloaliphatic acyl halide or mixture thereof, wherein the amine-reactive reactant has, on the average, at least about 2 acyl halide groups per reactant molecule.

15. The process as claimed in claim 14, wherein polymerization occurs in the presence of a monomeric amine salt.

16. The process as claimed in claim 14, wherein said water permeable membrane is produced by the process comprising the steps of:
   (a) coating a microporous support with an aqueous solution consisting essentially of an essentially monomeric bipiperidine reactant of Formula (I) to form a liquid layer on said microporous support;
   (b) contacting said liquid layer with an organic solvent solution of an essentially monomeric amine-reactive reactant comprising said polyfunctional acyl halide or mixture thereof, and
   (c) drying the product of step (b) so as to form said water permeable membrane.

17. The process as claimed in claim 16, wherein said aqueous bipiperidine solution also contains a monomeric salt.

18. The process as claimed in claim 14, wherein said water permeable membrane is produced by the process comprising the steps of:
   (a) coating a microporous support with a first aqueous solution comprising a monomeric amine salt to form a monomeric amine salt layer on said microporous support;
   (b) coating said monomeric amine salt layer with a second aqueous solution consisting essentially of an essentially monomeric bipiperidine reactant of Formula (I) form a liquid layer on said monomeric amine salt layer;
   (c) coating said liquid layer with an organic solvent solution of an essentially monomeric amine-reactive reactant comprising said polyfunctional acyl halide or mixture thereof; and
   (d) drying the product of step (c) so as to form said water permeable membrane.

19. The process as claimed in claim 14, wherein each of said non-reactive substituents is selected from the group consisting of alkyl, alkoxy, hydroxyl, alkylhydroxy, and halide moieties.

20. The process as claimed in claim 14, wherein said essentially monomeric bipiperidine reactant comprises a 4,4'-bipiperidine reactant of Formula (II):

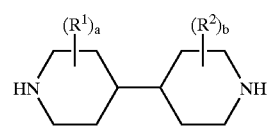
(II)

wherein each $R^1$ and each $R^2$ independently represents a non-reactive substituent and a and b each independently represent an integer of from 0 to 4.

21. The process as claimed in claim 20, wherein both a and b equal zero.

22. The process as claimed in claim 20, wherein a and b each equal 1.

23. The process as claimed in claim 22, wherein $R^1$ and $R^2$ each represent a hydroxyl moiety.

24. The process as claimed in claim 14, wherein said acyl halide has a functionality on the average of from about 2 to about 4 halide groups per reactant molecule.

25. The process as claimed in claim 24, wherein said acyl halide is selected from the group consisting of cyclohexane acyl halides, cyclobutane acyl halides and cyclopentane acyl halides.

26. The process as claimed in claim 24, wherein said acyl halide is selected from the group consisting of isophthaloyl chloride, trimesoyl chloride, and terephthaloyl chloride.

* * * * *